(12) United States Patent
Lin

(10) Patent No.: US 11,463,029 B2
(45) Date of Patent: Oct. 4, 2022

(54) CONTROL DEVICE AND CONTROL METHOD FOR CONTROLLING A SENSORLESS BLDC MOTOR OF A CEILING FAN

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 130 days.

(21) Appl. No.: 17/171,641

(22) Filed: Feb. 9, 2021

(65) Prior Publication Data
US 2022/0255476 A1    Aug. 11, 2022

(51) Int. Cl.
*H02P 6/182* (2016.01)
*G08C 17/00* (2006.01)
*F04D 27/00* (2006.01)
*F04D 25/06* (2006.01)

(52) U.S. Cl.
CPC ............. *H02P 6/182* (2013.01); *F04D 25/06* (2013.01); *F04D 27/00* (2013.01); *G08C 17/00* (2013.01)

(58) Field of Classification Search
CPC .......... H02P 6/182; F04D 25/06; F04D 27/00; G08C 17/00
See application file for complete search history.

(56) References Cited

U.S. PATENT DOCUMENTS

| | | | | |
|---|---|---|---|---|
| 4,640,668 A | * | 2/1987 | Yang | ...................... H02K 11/23 310/68 E |
| 7,196,485 B1 | * | 3/2007 | Lee | ......................... F24F 7/007 318/400.38 |

* cited by examiner

*Primary Examiner* — Zoheb S Imtiaz
(74) *Attorney, Agent, or Firm* — Birch, Stewart, Kolasch & Birch, LLP

(57) ABSTRACT

A control method is to be implemented by a control device, and includes: (A) storing a database that contains control parameter sets which respectively correspond to different types of sensorless BLDC motors; (B) detecting a resistance and an inductance of a sensorless BLDC motor of a ceiling fan, and searching the database, based on at least the detected resistance and the detected inductance, for one of the control parameter sets that corresponds to the sensorless BLDC motor of the ceiling fan; (C) detecting a back-EMF of the sensorless BLDC motor of the ceiling fan; and (D) generating a driver control signal based on said one of the control parameter sets and the detected back-EMF to drive the sensorless BLDC motor of the ceiling fan.

12 Claims, 3 Drawing Sheets

CONTROL DEVICE AND CONTROL METHOD FOR CONTROLLING A SENSORLESS BLDC MOTOR OF A CEILING FAN

FIELD

The disclosure relates to motor control, and more particularly to a control device and a control method for controlling a sensorless BLDC motor of a ceiling fan.

BACKGROUND

A brushless direct current (BLDC) motor does not have brushes that are used in a brushed motor and that wear out easily, and therefore has the advantages of being small and lightweight and creating little noise. In addition, since the BLDC motor does not have mechanical or electrical contacts between a stator and a rotor, a position of the rotor relative to the stator needs to be measured so that precise rotation control can be performed. One design uses Hall sensors to directly measure the position of the rotor. However, the use of Hall sensors would cause additional routing and thus increased production complexity, and reliability of the measured position would be degraded if the Hall sensors become dusty or is exposed to high humidity.

Another design measures a back-electromotive force (back-EMF) to infer the position of the rotor and is sensorless. However, different types of sensorless BLDC motors have different control parameters such as back-EMF constants, rated speeds, pole pair numbers, etc. When a sensorless BLDC motor is used in a ceiling fan, a control device that matches the parameters of the sensorless BLDC motor must be prepared. However, since there are many different types of sensorless BLDC motors in the market, preparing appropriate control devices for so many different types of sensorless BLDC motors would be problematic or troublesome for a factory or a company in terms of component preparation and management.

SUMMARY

Therefore, an object of the disclosure is to provide a control device and a control method for controlling a sensorless brushless direct current (BLDC) motor of a ceiling fan. The control device and the control method can alleviate the drawback of the prior art.

According to an aspect of the disclosure, the control device is adapted to be installed in a ceiling fan that includes a plurality of vanes and a sensorless BLDC motor. The control device includes a detector circuit, a driver circuit and a control circuit. The detector circuit is adapted to be coupled to the sensorless BLDC motor of the ceiling fan, and detects a resistance, an inductance and a back-electromotive force (back-EMF) of the sensorless BLDC motor of the ceiling fan to generate a detection output. The driver circuit is adapted to be coupled to the sensorless BLDC motor of the ceiling fan, is to receive a driver control signal, and drives the sensorless BLDC motor of the ceiling fan based on the driver control signal to rotate the vanes of the ceiling fan. The control circuit is coupled to the detector circuit to receive the detection output therefrom, is further coupled to the driver circuit, and includes a database that contains a plurality of control parameter sets which respectively correspond to different types of sensorless BLDC motors. Based on the resistance and the inductance as indicated by the detection output, the control circuit searches the database for one of the control parameter sets that corresponds to the sensorless BLDC motor of the ceiling fan. The control circuit generates the driver control signal for receipt by the driver circuit based on said one of the control parameter sets and the back-EMF as indicated by the detection output.

According to another aspect of the disclosure, the control method is to be implemented by a control device. The control device is to be installed in a ceiling fan that includes a plurality of vanes and a sensorless BLDC motor. The control method includes steps of: (A) storing a database that contains a plurality of control parameter sets which respectively correspond to different types of sensorless BLDC motors; (B) detecting a resistance and an inductance of the sensorless BLDC motor of the ceiling fan, and searching the database, based on at least the resistance and the inductance thus detected, for one of the control parameter sets that corresponds to the sensorless BLDC motor of the ceiling fan; (C) detecting a back-EMF of the sensorless BLDC motor of the ceiling fan; and (D) generating a driver control signal based on said one of the control parameter sets found in step (B) and the back-EMF detected in step (C) to drive the sensorless BLDC motor of the ceiling fan to rotate the vanes of the ceiling fan.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
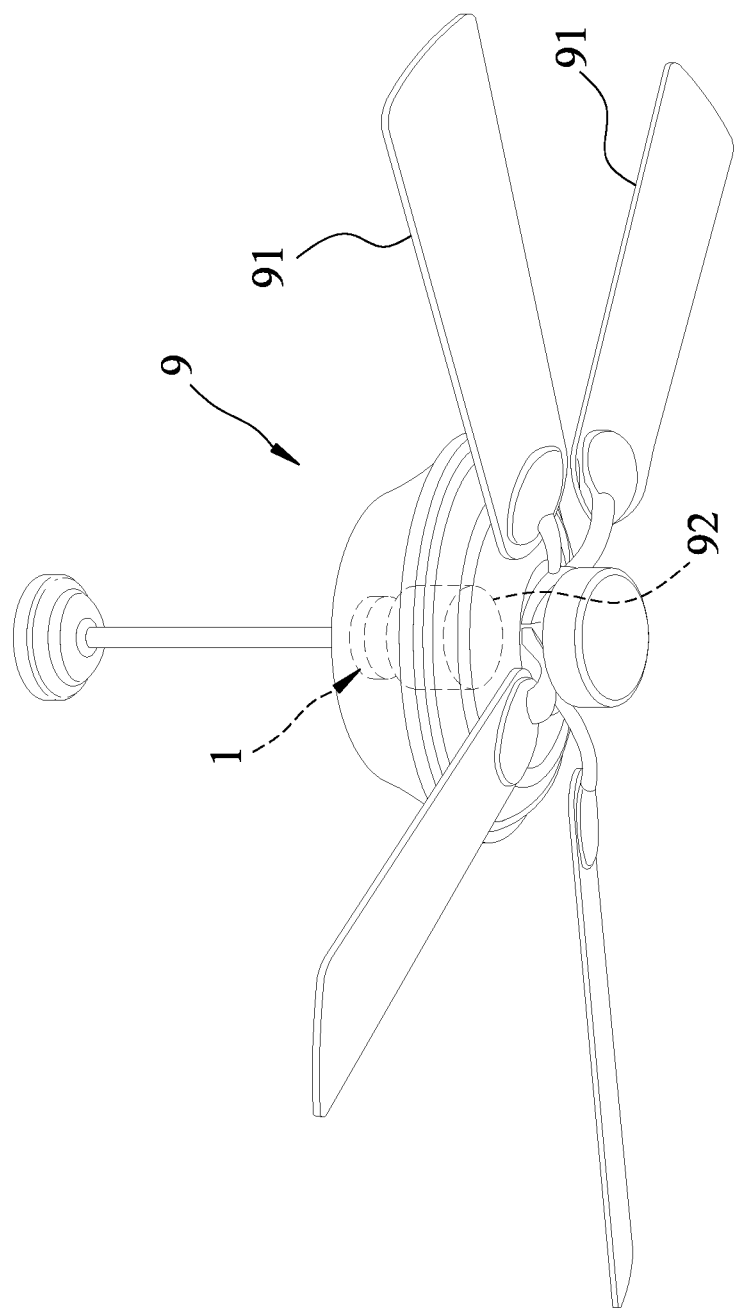
FIG. 1 is a schematic perspective view of a ceiling fan in which an embodiment of a control device according to the disclosure is installed.
Figure 2:
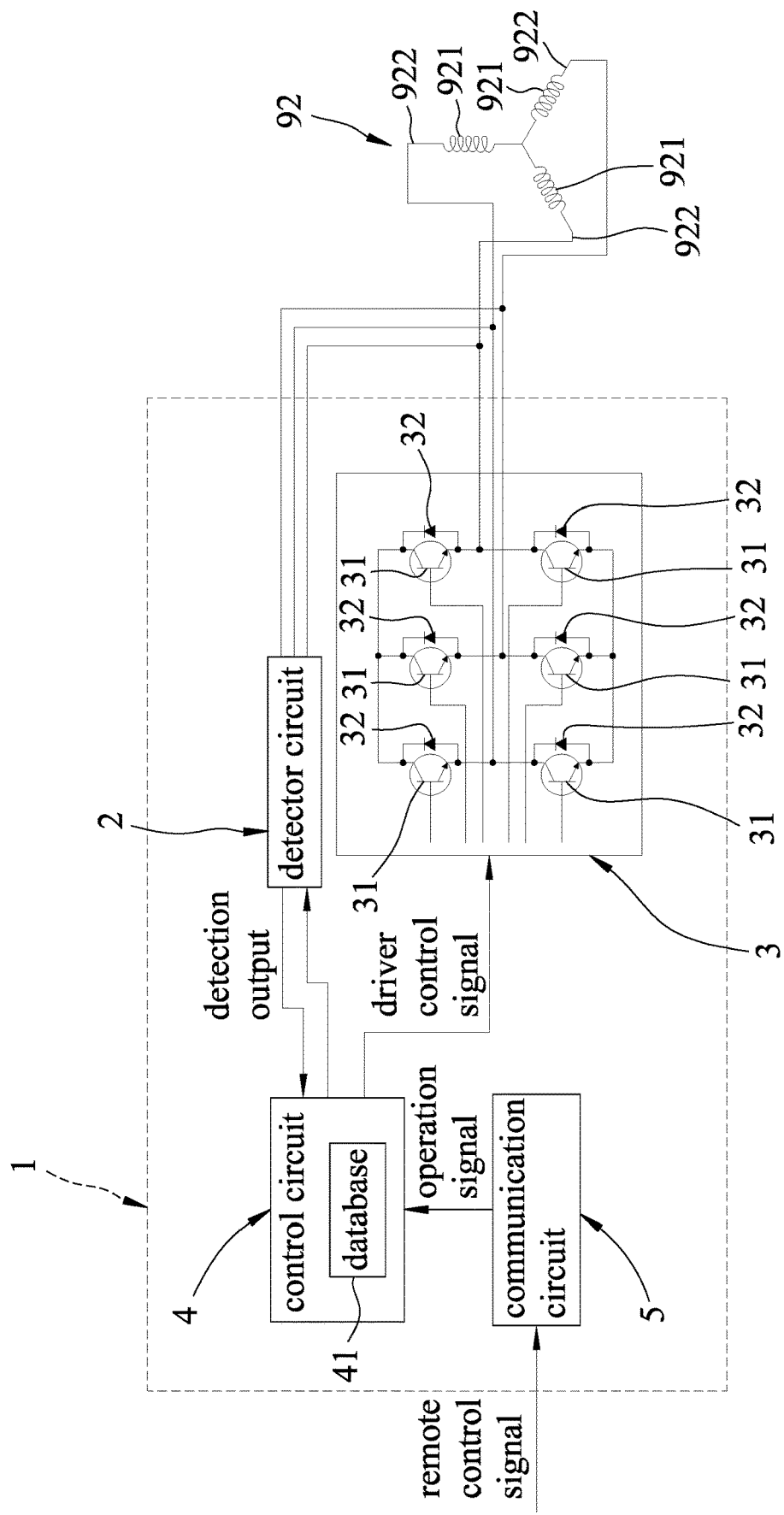
FIG. 2 is a circuit block diagram illustrating the embodiment.

Referring to FIGS. 1 and 2, an embodiment of a control device 1 according to the disclosure is adapted to be installed in a ceiling fan 9. The ceiling fan 9 includes a plurality of vanes 91, and a sensorless brushless direct current (BLDC) motor 92 coupled to the vanes 91. In this embodiment, the sensorless BLDC motor 92 includes three coils 921 and three terminals 922. However, in other embodiments, the total number of the coils 921 and the total number of the terminals 922 can be changed based on application requirements.

The control device 1 of this embodiment includes a detector circuit 2, a driver circuit 3 and a control circuit 4.

The detector circuit 2 is adapted to be coupled to the sensorless BLDC motor 92, and detects at least a resistance, an inductance and a back-electromotive force (back-EMF) of the sensorless BLDC motor 92 to generate a detection output. In an example, the detector circuit 2 includes an analog-to-digital converter (ADC) (not shown) coupled to the terminals 922, and obtains the resistance, the inductance and the back-EMF of the sensorless BLDC motor 92 based on digital representations of a voltage and a current of the sensorless BLDC motor 92 generated by the ADC. Configuration of the detector circuit 2 can be determined by one skilled in the art based on application requirements, and details thereof are omitted herein for the sake of brevity.

The driver circuit 3 is adapted to be coupled to the sensorless BLDC motor 92, is to receive a driver control signal, and drives the sensorless BLDC motor 92 based on the driver control signal to rotate the vanes 91. In this embodiment, the driver circuit 3 includes six bipolar junction transistors (BJTs) 31 and six diodes 32, with the BJTs 31 and the diodes 32 coupled as shown in FIG. 2, so that three-phase switching can be performed. However, in other embodiments, the total number of the BJTs 31 and the total number of the diodes 32 should be changed based on the total number of the coils 921 and the total number of the terminals 922.

The control circuit 4 (e.g., a processor, a controller, etc.) is coupled to the detector circuit 2 to receive the detection output therefrom, is further coupled to the driver circuit 3, and includes a database 41 that contains a plurality of control parameter sets which respectively correspond to different types of sensorless BLDC motors. Based on at least the resistance and the inductance as indicated by the detection output, the control circuit 4 searches the database 41 for one of the control parameter sets that corresponds to the sensorless BLDC motor 92. The control circuit 4 generates the driver control signal for receipt by the driver circuit 3 based on said one of the control parameter sets (hereinafter referred to as the target control parameter set for simplicity) and the back-EMF as indicated by the detection output.

In this embodiment, each of the control parameter sets includes multiple control parameters, which at least include a resistance, an inductance and a back-EMF constant. The control parameters may further include at least one of a rated speed, a rated current, a rated voltage, a pole pair number, a friction coefficient or a moment of inertia. The control parameters of each control parameter set are generally provided by a manufacturer of the corresponding type of sensorless BLDC motor, or can be found in a datasheet of the corresponding type of sensorless BLDC motor.

Optionally, the control device 1 of this embodiment further includes a communication circuit 5. The communication circuit 5 is to receive a remote control signal, and generate an operation signal based on the remote control signal. The control circuit 4 is further coupled to the communication circuit 5 to receive the operation signal therefrom, and controls, based on the operation signal, the detector circuit 2 to detect the resistance and the inductance of the sensorless BLDC motor 92 of the ceiling fan 9. In an example, the communication circuit 5 uses an infrared remote control standard to communicate with a remote controller, and one can operate the remote controller to generate the remote control signal for receipt by the communication circuit 5. In another example, the communication circuit 5 uses a radio remote control standard (e.g., Wi-Fi, Bluetooth, etc.) to communicate with a remote controller or a smart device (e.g., a smart speaker, a smartphone, etc.), and one can operate the remote controller or the smart device to generate the remote control signal for receipt by the communication circuit 5.

Figure 3:
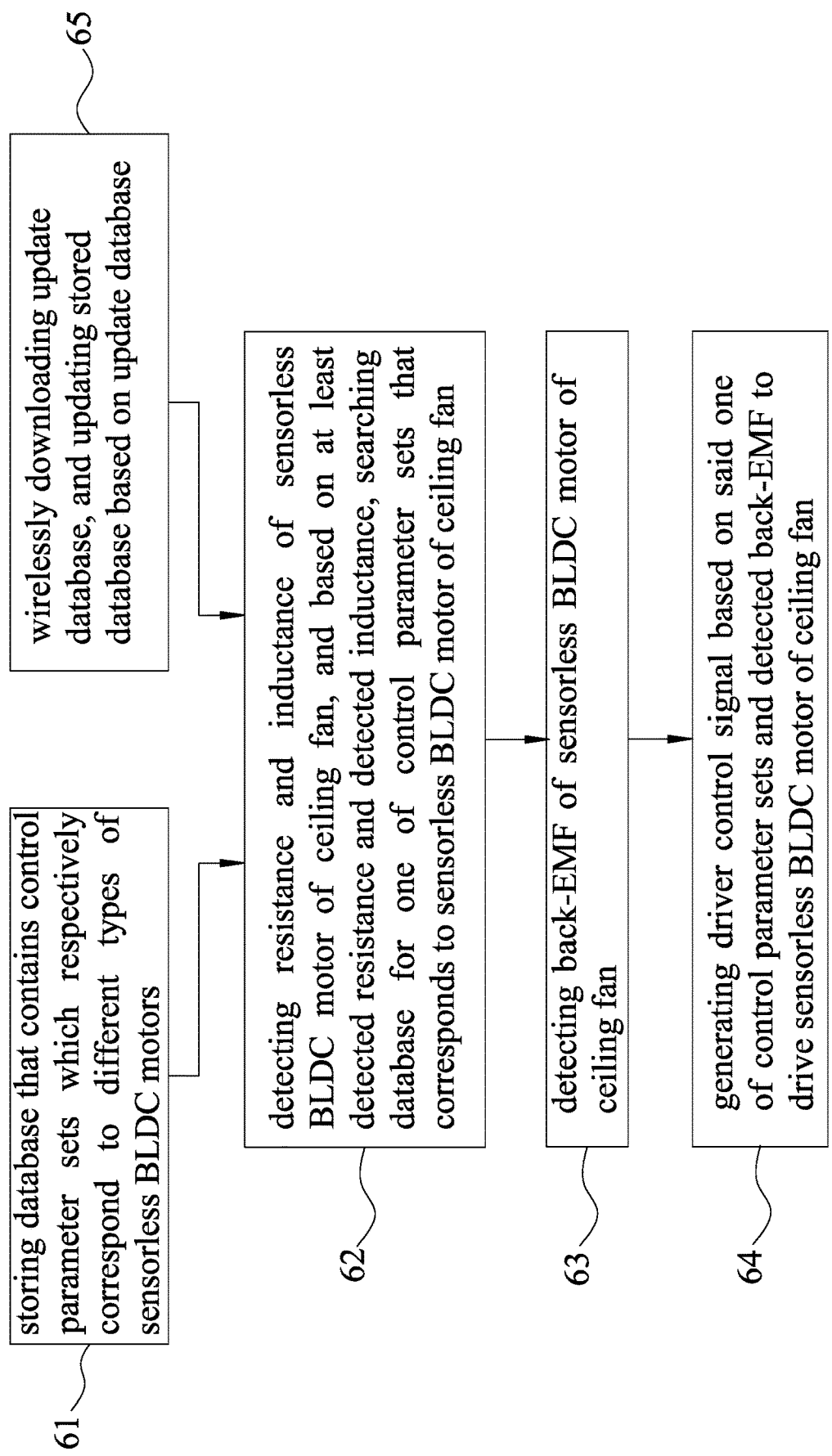
FIG. 3 is a flowchart illustrating a control method performed by the embodiment.

Referring to FIGS. 1 to 3, a control method performed by the control device 1 of this embodiment includes the following steps 61-64.

In step 61, the control circuit 4 stores the database 41.

In step 62, the detector circuit 2 detects at least the resistance and the inductance of the sensorless BLDC motor 92, and the control circuit 4 searches the database 41 for the target control parameter set based on at least the resistance and the inductance that are detected by the detector circuit 2.

In an example, the control circuit 4 obtains a resistance range around and covering the resistance detected by the detector circuit 2 and an inductance range around and covering the inductance detected by the detector circuit 2, and searches the database 41 for the target control parameter set based on the resistance range and the inductance range. The resistance range may be, for example, from 0.9 times the resistance detected by the detector circuit 2 to 1.1 times the resistance detected by the detector circuit 2, and the inductance range may be, for example, from 0.9 times the inductance detected by the detector circuit 2 to 1.1 times the inductance detected by the detector circuit 2. The resistance of the target control parameter set falls within the resistance range, and the inductance of the target control parameter set falls within the inductance range.

In a case where each of the control parameter sets further includes the moment of inertia and/or the friction coefficient, in step 62, the detector circuit 2 may further detect at least one of a moment of inertia or a friction coefficient of the sensorless BLDC motor 92 in a no-load state (i.e., a state in which the sensorless BLDC motor 92 is not coupled to the vanes 91), and the control circuit 4 may search the database 41 further based on the at least one of the moment of inertia or the friction coefficient that is detected by the detector circuit 2.

In step 63, the detector circuit 2 detects the back-EMF of the sensorless BLDC motor 92.

In step 64, the control circuit 4 generates the driver control signal based on the target control parameter set found in step 62 and the back-EMF detected in step 63 to drive the sensorless BLDC motor 92 to rotate the vanes 91.

Optionally, the control method further includes the following step 65.

In step 65, the control circuit 4 wirelessly downloads an update database via, for example, another communication circuit (not shown) of the control device 1, and updates the database 41 stored therein based on the update database.

In an example, the another communication circuit (not shown) uses a radio frequency communication standard (e.g., Wi-Fi, Bluetooth, etc.) for wireless communication.

In application, step 61 may be executed before the control device 1 leaves the factory. Step 62 may be executed the first time the control device 1 is supplied with power, each time the control device 1 is supplied with power (continuous supply of power to the control device 1 is considered as "one time" of supply of power, and an interruption to the continuous supply of power, such as power outage, would conclude said one time, and the supply of power after the interruption would be considered another time of supply of power), or when the control device 1 receives the remote control signal. Step 65 may be executed after the control device 1 has left the factory.

In an example, after an installer has assembled the ceiling fan 9 at a location designated by a user and has supplied power to the control device 1, the control device 1 automatically executes step 62, so that the vanes 91 are rotated by the sensorless BLDC motor 92 based on the target control parameter set that is obtained by the control circuit 4 searching the database 41 and that corresponds to the sensorless BLDC motor 92. Thereafter, the control device 1 repeatedly executes steps 63, 64 to drive the sensorless BLDC motor 92 to rotate the vanes 91 when the user turns on the ceiling fan 9. Alternatively, the control device 1 executes step 62 when the installer operates the remote controller or the smart device to generate the remote control signal for receipt by the control device 1.

In a case where each of the control parameter sets further includes the moment of inertia and/or the friction coefficient, where the detector circuit 2 further detects the at least one of the moment of inertia or the friction coefficient of the sensorless BLDC motor 92 in the no-load state in step 62, and where the control circuit 4 searches the database 41 further based on the at least one of the moment of inertia or the friction coefficient that is detected by the detector circuit 2 in step 62, the installer supplies power to the control device 1 before the vanes 91 are installed so as to cause the control device 1 to perform step 62 to search the database 41 for the target control parameter set based on the resistance, the inductance and the at least one of the moment of inertia or the friction coefficient that are detected by the detector circuit 2, so the sensorless BLDC motor 92 can rotate in steps 63 and 64 based on the target control parameter set that corresponds to the sensorless BLDC motor 92. It should be noted that the control circuit 4 can use more parameters to search the database 41 when the detector circuit 2 detects more parameters, thereby improving accuracy of search.

In a case where the control device 1 executes step 62 the first time the control device 1 is supplied with power, the control device 1 may include a non-volatile memory (not shown), and may store the target control parameter set in the non-volatile memory for later use. In a case where the control device 1 executes step 62 each time the control device 1 is supplied with power (e.g., recovery from power outage), the control device 1 may include a memory (e.g., a volatile memory) (not shown) and may store the target control parameter set in the memory, so when no power outage occurs, the control circuit 4 can obtain the target control parameter set by reading from the memory instead of executing step 62 again each time the ceiling fan 9 is turned on.

In view of the above, the control device 1 of this embodiment has the following advantages.

1. By virtue of the detector circuit 2 detecting at least the resistance and the inductance of the sensorless BLDC motor 92, and by virtue of the control circuit 4 storing the database 41 that contains a plurality of control parameter sets which respectively correspond to different types of sensorless BLDC motors and searching the database 41 for the target control parameter set based on at least the resistance and the inductance that are detected by the detector circuit 2, the control device 1 can be used to control the different types of sensorless BLDC motors. Therefore, it is not necessary to buy different types of control devices to respectively control the different types of sensorless BLDC motors, which is beneficial to a factory or a company in terms of component preparation and management. In addition, since the control device 1 automatically executes the aforesaid detection and search the first time it is supplied with power, each time it is supplied with power, or when it receives the remote control signal, it is convenient for the installer to set the ceiling fan 9.

2. By virtue of the detector circuit 2 further detecting the at least one of the moment of inertia or the friction coefficient of the sensorless BLDC motor 92 in the no-load state, and by virtue of the control circuit 4 searching the database 41 further based on the at least one of the moment of inertia or the friction coefficient that is detected by the detector circuit 2, accuracy of search can be improved when some of the control parameter sets have values that are close to each other.

3. By virtue of the control circuit 4 obtaining the resistance range around the resistance detected by the detector circuit 2 and the inductance range around the inductance detected by the detector circuit 2 and searching the database 41 based on the resistance range and the inductance range for the target control parameter set, inability to accurately find the target control parameter set due to detection error of the detector circuit 2 can be avoided.

4. By virtue of the control circuit 4 wirelessly downloading the update database and updating the database 41 based on the update database, the control device 1 can be used to control new types of sensorless BLDC motors that are later introduced, thereby extending the lifetime of the control device 1 in the market.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A control device adapted to be installed in a ceiling fan that includes a plurality of vanes and a sensorless brushless direct current (BLDC) motor, said control device comprising:
    a detector circuit adapted to be coupled to the sensorless BLDC motor of the ceiling fan, and detecting a resistance, an inductance and a back-electromotive force (back-EMF) of the sensorless BLDC motor of the ceiling fan to generate a detection output;
    a driver circuit adapted to be coupled to the sensorless BLDC motor of the ceiling fan, to receive a driver control signal, and to drive the sensorless BLDC motor of the ceiling fan based on the driver control signal to rotate the vanes of the ceiling fan; and
    a control circuit coupled to said detector circuit to receive the detection output therefrom, further coupled to said driver circuit, and including a database that contains a plurality of control parameter sets which respectively correspond to different types of sensorless BLDC motors;
    wherein, based on the resistance and the inductance as indicated by the detection output, said control circuit searching the database for one of the control parameter sets that corresponds to the sensorless BLDC motor of the ceiling fan, and said control circuit generates the driver control signal for receipt by said driver circuit based on said one of the control parameter sets and the back-EMF as indicated by the detection output.

2. The control device of claim 1, wherein each of the control parameter sets includes at least a resistance, an inductance and a back-EMF constant.

3. The control device of claim 2, wherein each of the control parameter sets further includes at least one of a rated speed, a rated current, a rated voltage, a pole pair number, a friction coefficient or a moment of inertia.

4. The control device of claim 1, further comprising:
a communication circuit to receive a remote control signal, and generating an operation signal based on the remote control signal;
wherein said control circuit is further coupled to said communication circuit to receive the operation signal therefrom, and controls, based on the operation signal, said detector circuit to detect the resistance and the inductance of the sensorless BLDC motor of the ceiling fan.

5. A control method to be implemented by a control device, the control device to be installed in a ceiling fan that includes a plurality of vanes and a sensorless brushless direct current (BLDC) motor, said control method comprising steps of:
(A) storing a database that contains a plurality of control parameter sets which respectively correspond to different types of sensorless BLDC motors;
(B) detecting a resistance and an inductance of the sensorless BLDC motor of the ceiling fan, and searching the database, based on at least the resistance and the inductance thus detected, for one of the control parameter sets that corresponds to the sensorless BLDC motor of the ceiling fan;
(C) detecting a back-electromotive force (back-EMF) of the sensorless BLDC motor of the ceiling fan; and
(D) generating a driver control signal based on said one of the control parameter sets found in step (B) and the back-EMF detected in step (C) to drive the sensorless BLDC motor of the ceiling fan to rotate the vanes of the ceiling fan.

6. The control method of claim 5, wherein each of the control parameter sets includes at least a resistance, an inductance and a back-EMF constant.

7. The control method of claim 6, wherein each of the control parameter sets further includes at least one of a rated speed, a rated current, a rated voltage, a pole pair number, a friction coefficient or a moment of inertia.

8. The control method of claim 5, wherein:
step (B) further includes detecting at least one of a moment of inertia or a friction coefficient of the sensorless BLDC motor of the ceiling fan in a no-load state; and
in step (B), the database is searched further based on the at least one of the moment of inertia or the friction coefficient thus detected.

9. The control method of claim 5, wherein the searching the database, based on at least the resistance and the inductance thus detected, for one of the control parameter sets that corresponds to the sensorless BLDC motor of the ceiling fan in step (B) includes:
obtaining a resistance range around and covering the resistance thus detected and an inductance range around and covering the inductance thus detected; and
searching the database based on the resistance range and the inductance range for said one of the control parameter sets.

10. The control method of claim 9, wherein the resistance range is from 0.9 times the resistance thus detected to 1.1 times the resistance thus detected, and the inductance range is from 0.9 times the inductance thus detected to 1.1 times the inductance thus detected.

11. The control method of claim 5, further comprising:
(E) wirelessly downloading an update database, and updating the database stored in the control device based on the update database.

12. The control method of claim 11, wherein the update database is wirelessly downloaded using a radio frequency communication standard.

* * * * *